(12) United States Patent
Aamodt et al.

(10) Patent No.: US 7,297,443 B2
(45) Date of Patent: Nov. 20, 2007

(54) LITHIUM-LIMITED ANODE SUBASSEMBLY

(75) Inventors: Paul B. Aamodt, Richfield, MN (US); Karl E. Hokanson, Coon Rapids, MN (US); Sonja K. Somdahl, Minneapolis, MN (US); Craig L. Schmidt, Eagan, MN (US); Joseph J. Viavattine, Vadnais Heights, MN (US)

(73) Assignee: Medtronic, Inc., Minneapolis, MN (US)

( * ) Notice: Subject to any disclaimer, the term of this patent is extended or adjusted under 35 U.S.C. 154(b) by 443 days.

(21) Appl. No.: 10/661,909

(22) Filed: Sep. 12, 2003

(65) Prior Publication Data

US 2005/0058888 A1    Mar. 17, 2005

(51) Int. Cl.
*H01M 4/00* (2006.01)
*H01M 4/02* (2006.01)
*H01M 4/64* (2006.01)
*H01M 4/72* (2006.01)

(52) U.S. Cl. .................. 429/211; 429/94; 429/233
(58) Field of Classification Search ............ None
See application file for complete search history.

(56) References Cited

U.S. PATENT DOCUMENTS

| | | | | |
|---|---|---|---|---|
| 4,333,994 A | * | 6/1982 | Urry | .............. 429/94 |
| 5,458,997 A | | 10/1995 | Crespi et al. | .............. 429/219 |
| 5,486,215 A | * | 1/1996 | Kelm et al. | .............. 29/623.1 |
| 5,540,701 A | | 7/1996 | Sharkey et al. | .............. 606/153 |
| 6,051,038 A | | 4/2000 | Howard et al. | .............. 29/623.1 |
| 6,287,719 B1 | * | 9/2001 | Bailey | .............. 429/94 |
| 6,805,719 B2 | | 10/2004 | Aamodt et al. | .............. 29/623.1 |
| 2004/0064163 A1 | | 4/2004 | Aamodt et al. | .............. 607/36 |

\* cited by examiner

*Primary Examiner*—Patrick Joseph Ryan
*Assistant Examiner*—Julian Mercado
(74) *Attorney, Agent, or Firm*—Paul H. McDowall; Girma Wolde-Michael

(57) ABSTRACT

An anode subassembly is provided for use in an implantable electrochemical cell wherein the anode subassembly includes an anode current collector designed to eliminate perforation edges in the final, outermost turn of a coiled electrode assembly. The anode current collector may be of a reduced size, discontinuous, or formed from alternating perforated and solid areas. The anode subassembly may further include reinforcing elements to support a thin anode layer in the outermost coil of a coiled, anode-limited cell. Reinforcing elements may take the form of a spacer, extensions extending from a reduced-size anode current collector, or strips of alkali metal.

18 Claims, 14 Drawing Sheets

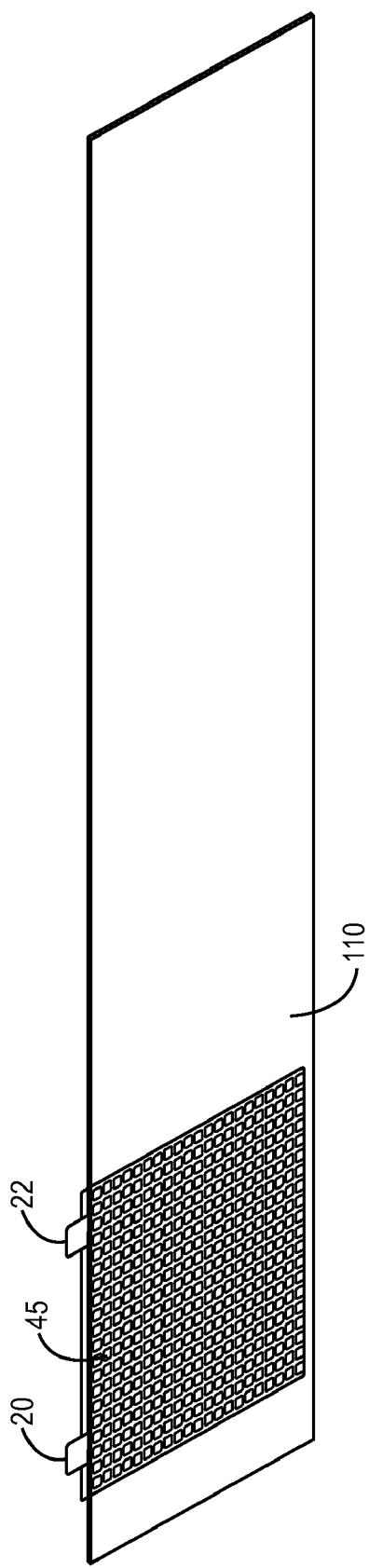
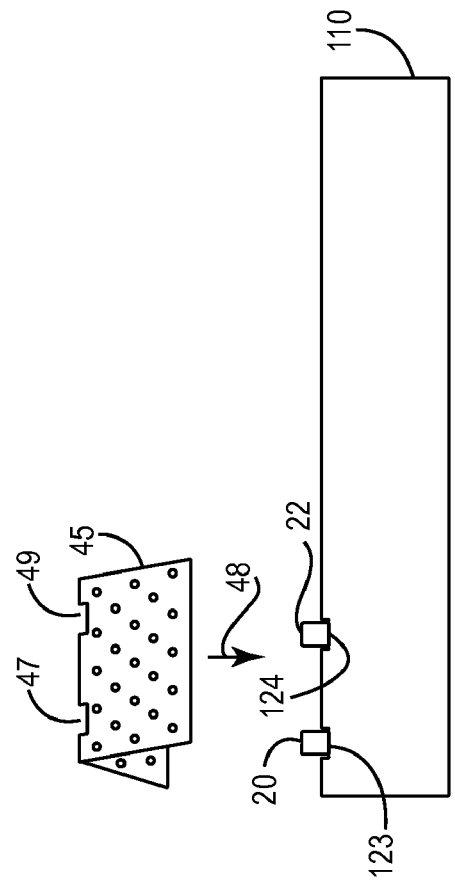

LITHIUM-LIMITED ANODE SUBASSEMBLY

CROSS-REFERENCE TO RELATED APPLICATIONS

This application cross-references two co-pending non-provisional U.S. patent applications filed on herewith on Sep. 12, 2003; namely, U.S. patent application Ser. No. 10/661,920 entitled, "Lithium-Limited Anode Subassembly with Solid Anode Current Collector and Spacer" and U.S. patent application Ser. No. 10/661,666 entitled, "Spacer Separator Subassembly" the contents of both are hereby incorporated by reference.

FIELD OF THE INVENTION

The present invention relates to the field of electrochemical cells, and, more particularly, the present invention relates to an anode subassembly for use in implantable electrochemical cells.

BACKGROUND OF THE INVENTION

Implantable cardiac stimulation devices, such as defibrillators and pacemakers, are used to treat patients suffering from cardiac arrhythmias or other cardiac dysfunction. In operation, such devices may continuously monitor the electrical activity of the heart and deliver appropriate stimulation therapies to normalize electrical or mechanical dysfunction. Cardiac stimulation devices must possess low self-discharge in order to have a useful life of many months, and must be highly reliable to provide a needed therapy whenever necessary. In implantable defibrillators, the power source must have a high rate capability to provide the necessary charge to the capacitors for delivering high-energy shocks. In addition, since cardiac stimulation devices are implanted, the battery must be able to supply energy from a minimum packaged volume.

Batteries or electrochemical cells are volumetrically constrained systems. The size or volume of components that go into a battery (cathode, anode, separator, current collectors, electrolyte, etc.) cannot exceed the available volume of the battery case. In addition, the appropriate amount of some components depends on the amount of other components that are used. These components must be "balanced" to provide discharge to the extent desired.

In a conventional cathode-limited battery such as a lithium-silver vanadium oxide (LiSVO) battery commonly used in cardiac stimulation devices, the capacity ($Q_+$) of the cathode must not exceed the capacity ($Q_-$) of the anode. Cathode limited cells have been used in battery powered implantable medical devices such as heart pacemakers because of the proven reliability of their discharge over the long periods during which they are implanted. The volume occupied by the other battery components also depends on the cathode capacity ($Q_+$) as reflected by the amount of cathode material in the battery. The amount of electrolyte depends on the amount of cathode material and the amount of it to be discharged since the cathode material can swell as the battery is discharged and requires more electrolyte to fill the additional cathode volume. The volume of the separator and current collector depends on the area of the electrodes. The area of the electrodes depends on the area required for consistent pulse output as the battery is discharged. All of these components must be adjusted for a given battery volume.

One method for constructing a lithium anode cell is to wind cathode and anode elements together to form a cylindrical or oblong coil. In a coiled design, anode material is available on either side of the cathode windings and will deplete into the cathode as the battery is discharged. Reliable performance is assured by having an excess of anode capacity beyond the usable capacity desired of the cathode. This excess lithium is distributed through the length of the anode. The lithium winding forming the outermost winding of the coil has cathode material adjacent to its inner circumference but not on the outer circumference. Therefore the outermost winding of the anode need only be half the thickness of the inner windings. If an anode is constructed from a single piece of foil that is of uniform thickness, there is an additional excess of lithium on the outermost winding of the coil.

One disadvantage of a cathode-limited cell is that the excess lithium in the cell may reduce other materials after the cathode is fully discharged, which can lead to cell swelling. In order to prevent damage to circuitry within the implantable device surrounding the cell due to cell swelling, a reinforcing stainless steel plate may be provided against the cell. This stainless steel plate occupies valuable space in an implantable device and adds weight to the overall device. In regard to implantable medical devices, a reduced size and weight is desirable to ease the implant procedure and avoid patient discomfort at the implant site. Eliminating the excess lithium or the need for the stainless steel plate would allow the cell size, and therefore the overall size of the medical device, to be reduced. Alternatively, the volume occupied by excess lithium and the steel plate could otherwise be taken up by cathode material to increase the battery capacity.

Another disadvantage of a cathode-limited cell is that its resistance increases as a function of time after the cell is discharged to the second voltage plateau on its discharge curve. By limiting the amount of lithium and electrolyte material in the cell, the cell may be designed to utilize only the first voltage plateau. Superior long-term cell performance can be achieved since the same useful capacity can be provided as in a conventionally balanced cell but at a higher voltage toward the end of the discharge cycle. A lithium-limited balanced cell having these advantages is disclosed in U.S. Pat. No. 5,458,997 to Crespi et al, incorporated herein by reference in its entirety.

In a coiled, anode-limited cell it is desirable to reduce the excess anode material present in the outermost winding that does not interface cathode material on both sides. One method for manufacturing an anode-limited cell that eliminates the excess anode material involves layering two lithium foil pieces. One lithium foil is provided long enough to form all of the windings in a coil, and the other lithium foil is provided long enough to form only the inner windings. When the two foils are overlaid and coiled with a cathode, the inner coil windings are formed by a double layer of lithium foil and the outermost winding by a single layer of lithium foil.

Another method for reducing excess lithium in an anode-limited cell is disclosed in commonly assigned U.S. patent application Ser. No. 10/123,495 filed 15 Apr. 2002 and entitled, "Balanced Anode Electrode" (Atty. Dkt. P-10327.00) invented by Aamodt et al., the contents of which are hereby incorporated by reference.

The disclosed method utilizes a short, thin lithium foil joined to a long, thick lithium foil such that the shorter, thinner foil will form the outermost coil winding and the longer thicker foil will form all of the inner windings. This method advantageously provides a narrow tolerance of the anode material for fully gaining the benefits of an anode-limited cell.

The anode current collector is commonly provided as a perforated conductive material such as a perforated nickel or titanium (e.g., a grid or screen). During assembly, the anode current collector is pressed against the anode material such that the anode material becomes enmeshed with the openings in the anode current collector. In this way, the openings in the anode current collector grid act to strengthen the mechanical joint between the current collector and the anode material and prevent separation of these components. The anode current collector further acts to provide reinforcement to the thin lithium layer in the outermost winding of a lithium-limited cell.

A limitation exists, however, in coiled anode-limited cells of this type relating to the potential for a short to occur between the cathode material and the anode current collector. When the thin layer of lithium has substantially depleted into the cathode in the outermost winding, the cathode may press into the anode current collector potentially causing a short. The anode current collector may extend the length of the coil windings but is typically positioned only on the outermost coil winding. The inventors of the present invention have discovered that, when the anode material becomes depleted toward the end of cell discharge, the cathode material may exert a force sufficient to press against the anode current collector. Cracks that naturally and commonly occur in coiled cathode material create exposed edges of the cathode material that when forced against the edges of the perforations or holes in the anode current collector grid, particularly in the final turn of the outermost winding of a coiled electrode assembly, can also contribute to the problem. Even if a robust separator material layer is present between the cathode and anode subassemblies, the separator material may tear when pressed between a cathode crack edge and an anode current collector edge. The possibility exists, therefore, for an electrical short to occur between the cathode material and anode current collector.

Though this mechanism is likely highly infrequent, it could result in potentially serious consequences for an implanted or difficult to retrieve electronic device. Thus, an improved anode subassembly design is warranted which overcomes the potential failure mechanism described above, particularly in anode-limited cells but potentially in any cell in which cathode cracking may precipitate a short between the cathode and anode.

BRIEF SUMMARY OF THE INVENTION

The present invention addresses the limitations described above by providing an anode subassembly that includes an anode current collector designed to eliminate perforation or grid edges in the last turn of the outermost coil winding. The anode subassembly includes the anode current collector mechanically pressed against an alkali metal anode to thereby promote secure attachment between the anode current collector and anode material. The anode subassembly has a leading edge and a trailing edge. The anode subassembly may be enveloped within a separator and wound with a cathode subassembly to form a coiled electrode assembly, beginning with the leading edge of the anode subassembly at the center of the coil and ending with the trailing edge on the outermost coil winding. The outermost coil winding includes: a first turn; a first generally straight segment; a second turn, which is the last or final turn of the coil; and a second generally straight segment.

One aspect of the present invention is the elimination of anode current collector perforation edges from the second turn of the outermost winding, where a short is most likely to occur as described above. In one embodiment, an anode current collector grid of reduced size is provided such that the anode current collector grid is positioned only on the second straight segment of the outermost coil.

In another embodiment, the anode current collector is provided as a discontinuous grid formed in two sections. The first current collector section is positioned along the first turn and first generally straight segment of the outermost winding and the second current collector section is positioned along the second generally straight segment of the outermost winding.

In yet another embodiment, the anode current collector is formed from alternating perforated or grid areas and solid areas. A first solid area may be provided at the leading edge of the anode current collector, which will reinforce an area of overlap between relatively thick and thin pieces of alkali metal foil used for forming the alkali metal anode. Next, a first perforated area will correspond to the area of the first generally straight segment of the outermost winding. Next, a second solid area is provided for positioning along the second turn of the outermost winding, and lastly a second perforated area is provided for positioning along the second generally straight segment of the outermost winding.

Another aspect of the present invention is to provide reinforcement of the thin anode material forming the outermost coil winding to improve the handling properties of the anode subassembly and/or reinforcing a seam, also referred to herein as the "area of overlap", between two pieces of alkali metal used to fabricate the alkali metal anode.

In some embodiments, reinforcement is achieved by providing a reduced-size anode current collector with one or more extension members for extending across an area of overlap between thin and thick pieces of alkali metal anode material. The anode current collector extension member(s) provide reinforcement of the area of overlap. The extension member(s) additionally provide support to the thin alkali metal piece forming the outermost coil winding.

Additionally or alternatively, reinforcement is achieved by including a spacer in the anode subassembly for reinforcing the thin alkali metal anode in areas not supported by a reduced-size or discontinuous anode current collector. The spacer may be pressed onto the alkali metal anode on the side opposite the anode current collector. In one embodiment, the spacer is formed from a film of microporous, non-conductive material such as polyethylene or polypropylene. In another embodiment, the spacer is formed from a perforated sheet of a fluoropolymer, such as a perforated sheet of ethylene tetrafluoroethylene (ETFE).

A reinforcing spacer may be positioned along the area of overlap between a thin and thick piece of alkali metal material used to form the alkali metal anode. The spacer may extend along the inner surface of the anode on the first turn of the outermost winding, the first generally straight segment of the outermost winding and/or the second turn of the outermost winding when a reduced-size anode current collector is positioned along the second generally straight segment of the outermost winding. The spacer may be positioned between the first and second sections of a discontinuous anode current collector, on the opposite side of the alkali metal anode from the anode current collector, to reinforce the thin alkali metal anode between the anode current collector sections.

In yet other embodiments, reinforcement is achieved by pressing strips of alkali metal onto the anode to add reinforcement along the top and bottom edges of at least a portion of the outermost winding and/or along the seam between thin and thick pieces of alkali metal used to form the alkali metal anode.

In still another embodiment, an anode current collector subassembly is provided including two anode current collector sections and an intervening spacer. The anode current collector subassembly is pressed onto an alkali metal anode to form the anode subassembly. The anode current collector subassembly is positioned on the anode such that a first current collector section will be positioned along the first turn and the first straight segment of the outermost winding, the spacer will be positioned along the second turn of the outermost winding and provide reinforcement of the anode thereto, and a second current collector section will be positioned along the second straight segment of the outermost winding.

BRIEF DESCRIPTION OF THE DRAWINGS

FIG. 13 is a perspective view of an anode subassembly enveloped in a separator provided with a spacer positioned on the outside of the separator.

FIG. 14 is a perspective view illustrating a method of assembling the spacer and separator of FIG. 13.

DETAILED DESCRIPTION OF THE PREFERRED EMBODIMENTS

The present invention is aimed at providing an improved anode subassembly for use in an implantable electrochemical cell that is designed to prevent cell failure due to shorting between the cathode material and the anode current collector, particularly when the anode material becomes depleted. The benefits of the present invention may be realized in anode-limited cells wherein the anode becomes depleted before the cathode. However, it is expected that the benefits of the present invention may also be realized in cathode-limited cells wherein cracks in the cathode material, in particular in cells having relatively thick cathode material, may lead to shorting between the cathode and anode.

While a variety of battery configurations and constructions are possible for anode-or cathode-limited cells, the methods included in the present invention are particularly suited for batteries having folded, coiled or wrapped electrode configurations, such as the batteries disclosed in U.S. Pat. No. 5,486,215 issued to Kelm et al., and U.S. Pat. No. 6,051,038 issued to Howard et al, both patents incorporated herein by reference in their entirety. The inventors of the present invention have recognized that a shorting failure can potentially occur in a coiled, lithium-limited cell between the cathode material and the anode current collector on the outermost winding as the thin lithium layer depletes into the cathode during cell discharge. The inventors have further recognized that this potential failure mechanism, though expectedly rare, is most likely to occur in the last turn of the coil, in the outermost winding, if it occurs at all.

Figure 1A:
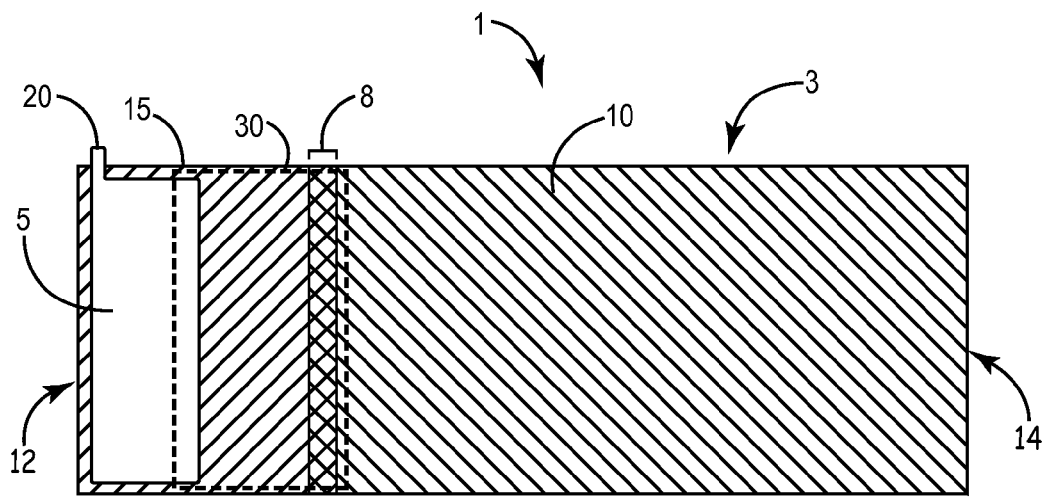
FIGS. 1A through 1C are top plan views of an anode subassembly, provided by the present invention, having a reduced-size anode current collector and showing various arrangements of an alkali metal anode for use in an anode-limited electrochemical cell.

FIG. 1A is a top plan view of an anode subassembly 1 to be included in an electrochemical cell according to one embodiment of the present invention. The anode subassembly 1 includes an anode current collector grid 5 attached to an alkali metal anode 3 formed from two pieces of anode material, 10 and 15. The anode current collector 5 is a flat, thin conductive metal grid or perforated conductive metal that is corrosion-resistant when associated with the alkali metal pieces 10 and 15. The anode current collector 5 is preferably fabricated from titanium, nickel, copper or an alloy of nickel or copper. One or more connector tabs 20 may project from anode current collector 5 to allow anode connection to a desired battery terminal.

Anode current collector grid 5 is of a reduced size relative to prior art anode current collector grids which typically extend for most or all of the length of the outermost coil winding or even further into the inner coil windings. As will be described in greater detail below in conjunction with FIG. 3, anode current collector grid 5 is sized and positioned on anode 3 such that it will be present on the outer surface of the last straight segment of the outermost coil winding. When anode subassembly 1 is wound with a cathode subassembly to form an oblong, coiled electrode assembly, starting with a leading edge 14 at the center of the coil and ending with a trailing edge 12 of anode subassembly 1, anode current collector 5 edges will not be present in the turns of the outermost coil.

In FIG. 1A, the alkali metal anode 3 is formed from an elongated piece of alkali metal 10 conjoined to a shorter and thinner piece of alkali metal 15. The alkali metal pieces 10 and 15 are preferably foils formed of lithium metal or an alloy of lithium. The two foil pieces 10 and 15 are partially overlapped to provide an interfacing area for forming a cohesive bond between the two pieces 10 and 15. The area of overlap 8 is preferably kept as narrow as possible to avoid excess lithium but still provide a stable cohesive bond. The cohesive bond is formed at the area of overlap 8 using high pressure.

The anode subassembly 1 shown in FIG. 1A is intended for use in an anode-limited cell wherein the shorter thinner piece of alkali metal 15 forms the outer winding of a coiled electrode assembly formed when anode subassembly 1 is wound around an appropriately-sized mandrel with a cathode subassembly. An anode subassembly including a short, thin piece of alkali metal for forming the outer electrode winding and a long, thicker piece of alkali metal for forming the inner electrode windings is generally disclosed in the above-referenced U.S. patent application Ser. No. 10/123, 495. Such an arrangement has the advantage of achieving a narrow anode material tolerance in an anode-limited cell.

In prior art designs, an anode current collector grid may extend over the area of overlap 8 to thereby stabilize and reinforce the cohesive bond between foils 10 and 15. In the embodiment shown in FIG. 1A, wherein anode current collector grid 5 is of a reduced size, a spacer 30 is provided for reinforcing the overlap area 8 between lithium foils 10 and 15 and for improving the handling characteristics of the anode subassembly 1 during cell assembly procedures. The thin lithium foil 15, supported by anode current collector grid 5 in a limited area, may be vulnerable to creasing or tearing during assembly procedures. By reinforcing the thin lithium foil 15 and area of overlap 8 with spacer 30, anode subassembly 1 handling properties are improved.

Spacer 30 is preferably pressed onto alkali metal anode 3 on the opposite side of anode 3 from current collector grid 5. Spacer 30 is preferably formed from a microporous, non-conductive film, such as a commercially available polyethylene or polypropylene film known for use as a battery separator material, which is chemically inert in the environment of the electrochemical cell. A preferred material for spacer 30 is a bilayer film including a microporous and non-woven layer of polypropylene.

Alternative anode material arrangements may be used within the scope of the present invention for forming the alkali metal anode 3. For example, the anode 3 may be formed from a single elongated piece of alkali foil 10 attached to the reduced-size, anode current collector grid 5 as shown in FIG. 1B, wherein the elongated alkali metal piece 10 extends the entire length of anode subassembly 1.

Figure 1B:
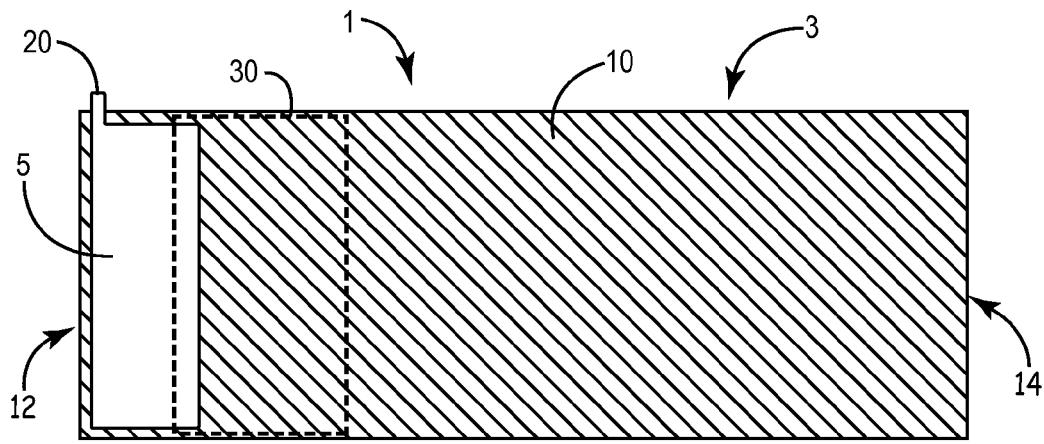
Figure 1C:
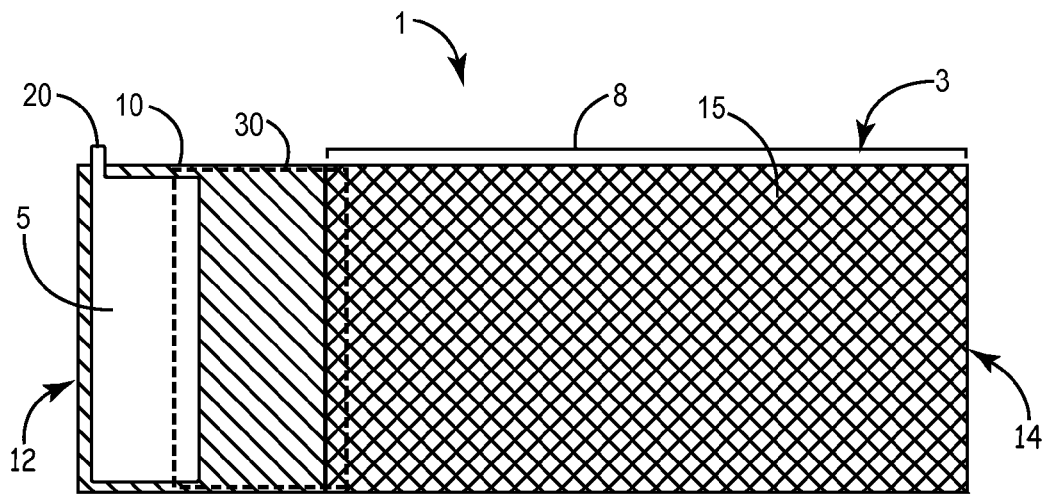

FIG. 1C illustrates yet another embodiment of an alkali metal anode arrangement. A long foil 10 is cohesively bonded to a shorter alkali metal foil 15 having a length corresponding to the linear distance of the inner coils of a wound electrode assembly. Anode current collector grid 5 is attached near the trailing edge 12 of long alkali metal piece 10. The area of overlap 8 of the long and short pieces 10 and 15 forms the inner coil windings of an electrode assembly, and long piece 10 forms the outer winding with anode current collector grid 5 positioned only on the outer face of the final straight segment of an oblong coil. In this embodiment, the long and short foils 10 and 15 may be provided with the same or different thickness.

In the embodiments of FIGS. 1A, 1B and 1C, the assembly process for producing anode subassembly 1 includes the step of pressing the alkali metal anode 3 onto anode current collector grid 5 to securely attach the anode current collector 5 to the anode material. Pressure of about 800 psi may be used to attach the anode current collector grid 5 to the anode 3. Anode current collector grid 5 is preferably pressed onto and thereby securely attached to the anode alkali metal near the trailing edge 12 of anode 3 at a location corresponding to the area that will become the outer surface of the final straight segment of an oblong, coiled electrode assembly.

The anode subassembly materials, namely anode current collector grid 5, alkali metal anode 3 which may include two foil pieces 10 and 15, and spacer 30, may be positioned as desired in a die. The die is then placed between platens of a hydraulic press which presses the anode 3 onto the anode current collector grid 5 and spacer 30 onto anode 3. Preferably the pressed joint between the anode current collector 5 and the alkali metal anode 3 withstands a pulling force of about 0.25 lbs or greater, depending on the materials used, without delaminating to ensure that delamination does not occur during the expected useful life of the device.

Spacer 30 is pressed onto the alkali metal anode 3, preferably on the opposite side of the anode 3 from anode current collector grid 5. Spacer 30 is positioned over an area of anode 3 which will become the outermost winding of a coiled electrode. Spacer 30 may be positioned and sized such that it provides reinforcement in the area of overlap 8 and/or at least a portion of anode 3 along the outermost winding where anode 3 is not supported by anode current collector 5. Spacer 30 may optionally extend over at least a portion of the area supported by anode current collector 5 such that the anode material is "sandwiched" between the current collector grid 5 and spacer 30. Though shown to extend only slightly over current collector grid 5 in FIGS. 1A through 1C, spacer 30 may optionally extend to trailing edge 12 such that it also covers the anode supported by current collector grid 5.

Spacer 30 and anode current collector grid 5 may be pressed onto the anode material in a single pressing step or in two separate pressing steps. The pressure applied preferably deforms the anode metal into intimate contact with the spacer. When the bilayer film including microporous and non-woven layers indicated above is used for fabricating spacer 30, the non-woven side is preferably placed against the anode alkali metal.

Figure 2:
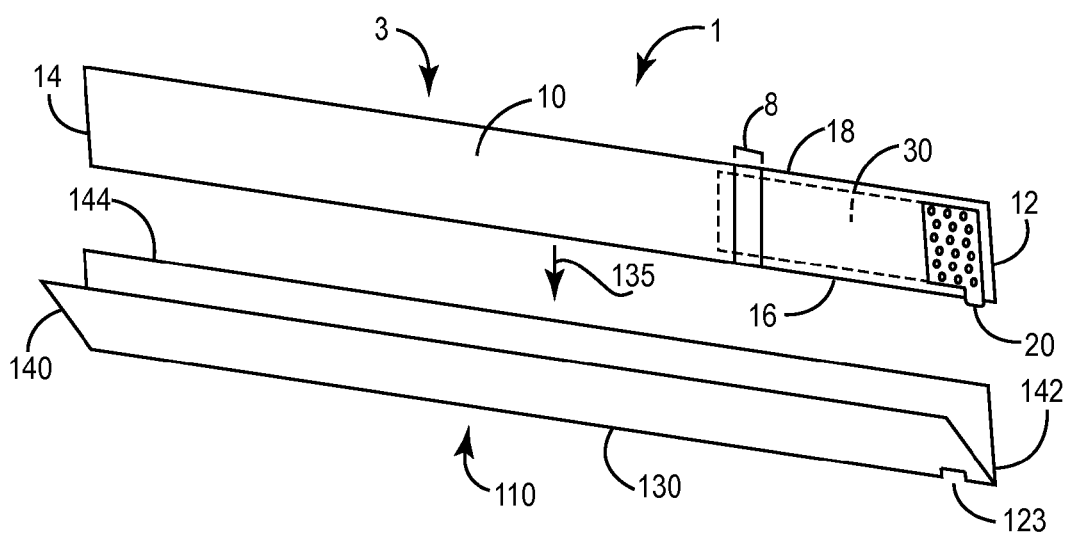
FIG. 2 is a perspective view of an anode subassembly being packaged in a separator.

Anode subassembly 1 may be enveloped in a separator before cell assembly. FIG. 2 is a perspective view of an anode subassembly 1 being packaged in a separator 110. Anode subassembly 1 shown in FIG. 2 corresponds to the anode subassembly shown in FIG. 1A, however, any of the various anode subassembly embodiments described herein may be packaged in a separator 110 prior to electrode assembly. Separator 110 may be formed from a microporous, single layer or multi-layer film formed from a non-conductive material that is chemically inert in the environment of the electrochemical cell, such as polypropylene and/or polyethylene. Numerous commercially available separator materials are known in the art. In one embodiment, separator 110 is formed as a single layer of polypropylene film about 0.001 inches in thickness.

Separator 110 is elongated and sized appropriately for enveloping anode subassembly 1. Separator 110 is folded longitudinally along its midline 130 such that anode subassembly 1 may be inserted into separator 110 as indicated by arrow 135. After positioning anode subassembly 1 in separator 110, separator 110 may optionally be sealed along the three open edges 140, 142, and 144 by applying heat to a desired seam area along each edge 140, 142 and 144. Separator 110 may be sealed closed around anode subassembly 1 using conventional heat sealing equipment. A slit 123 is provided in separator subassembly 110 to accommodate anode connector tab 20 that allows anode connection to a desired battery terminal.

Separator 110 may alternatively take the form of a separator subassembly that further includes a spacer joined to separator 110 to provide an additional layer of protection between the anode current collector and cathode in a wound electrode assembly, as generally disclosed in commonly assigned, co-pending U.S. patent application Ser. No. 10/661,666 incorporated herein by reference in its entirety. With regard to the anode subassembly embodiments described herein, a spacer included in a separator subassembly may provide additional reinforcement of the alkali metal anode 3 in areas unsupported by the anode current collector 5.

Figure 3:
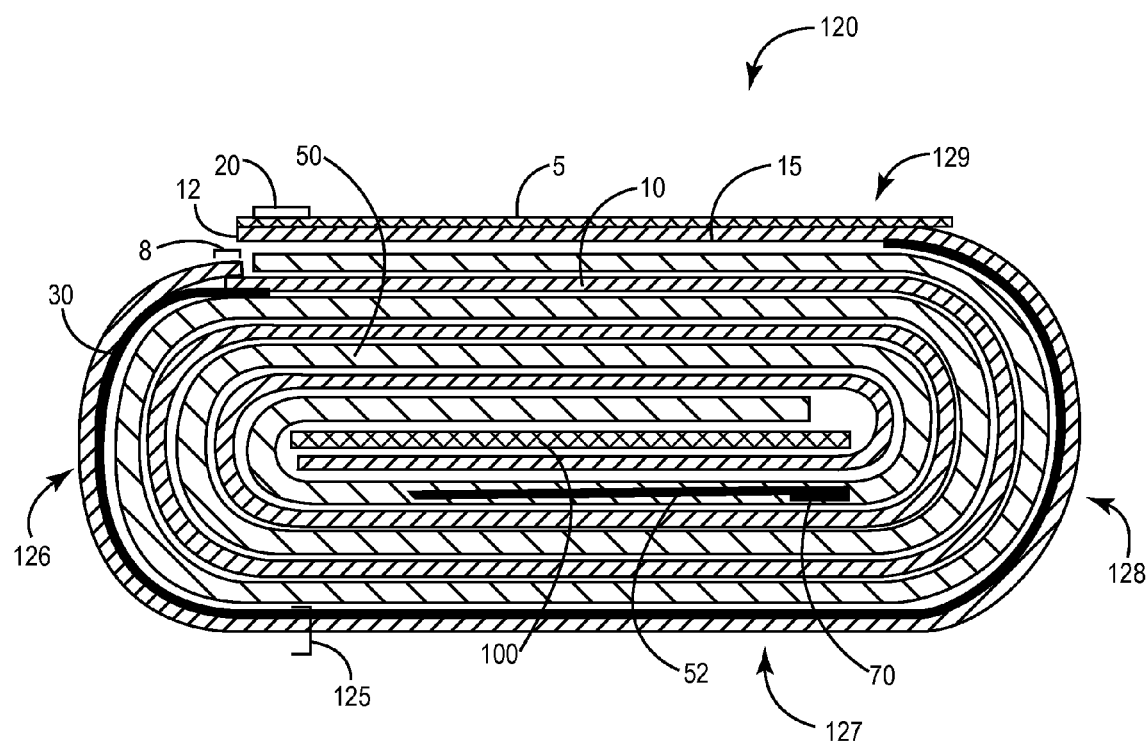
FIG. 3 is an end view of an electrode assembly including the anode subassembly of FIG. 1A.

FIG. 3 is an end view of an electrode assembly including the anode subassembly 1 of FIG. 1A. Electrode assembly 120 is formed by winding anode subassembly 1 with a cathode subassembly around an appropriately sized mandrel 100. The cathode subassembly includes cathode material 50 and a cathode current collector 52. The cathode current collector 52 is formed from a conductive metal that is corrosion resistant at the cathode potential, such as titanium or aluminum. The cathode current collector may be provided with one or more projecting connector tabs 70 to allow connection to a cathode terminal. The cathode material 50 includes a solid reactive cathode ingredient, such as silver vanadium oxide (SVO), and may include other materials such as binding materials or conductivity enhancers as desired.

A method for winding the electrode assembly 120 may be performed as described in previously-referenced U.S. Pat. No. 5,486,215 or U.S. Pat. No. 6,051,038. The length of the anode subassembly 1 relative to the cathode subassembly is such that the outermost winding 125 of the electrode assembly 120 is formed by the anode subassembly 1. Moreover, the length of the elongated alkali metal piece 10 and the length of the shorter, thinner alkali metal piece 15 are such that the thicker piece 10 forms the inner windings of the electrode assembly 120 and the thinner piece 15 forms the outermost winding 125 of the assembly 120. Prior to coiling anode and cathode subassemblies together, one or both of anode subassembly 1 and the cathode subassembly may be enveloped in a separator material in the manner generally described above.

After the anode and cathode subassemblies have been properly wound, the mandrel 100 may be removed. The inner windings of the anode subassembly 1 formed by the thicker alkali metal piece 10 face cathode 50 on both sides. The outermost winding 125 includes a first (also herein, a penultimate) turn 126, followed by a first (also herein, a penultimate) generally straight segment 127, a second (also herein, a final) turn 128 which is the last or final turn of the coil, and a second (also herein, a final) generally straight segment 129 ending at trailing edge 12. The outermost winding 125 is formed by the thin alkali metal piece 15 which faces cathode 50 only on one side. Spacer 30 is positioned on the inner surface of the outermost winding 125, starting from just before first turn 126 extending along straight segment 127 and through second turn 128, such that spacer 30 provides a reinforcing layer to the thin alkali metal piece 15 and to the area of overlap 8 between the thin and thick pieces 15 and 10, respectively.

Spacer 30 is shown in the embodiment of FIG. 3 to only partially overlap anode current collector grid 5 on second straight segment 129 of outermost winding 125. Spacer 30, however, may optionally extend further along second generally straight segment 129 or even all the way to trailing edge 12. Spacer 30 may optionally extend into the inner windings of electrode assembly 120, however, in a preferred embodiment, spacer 30 extends along the inside of the outermost winding only where reinforcement of the thin anode material is desired so as to minimize the volume occupied by spacer 30.

The anode subassembly 1 provided by the present invention reduces the risk of a short between the cathode material and anode current collector by eliminating the anode current collector grid from the region of the second turn 129 of the outermost coil, where a short is most likely to occur. As such, anode subassembly 1 is expected to improve the long-term reliability of electrode assembly 120. In addition, a reduced-size anode current collector occupies less of the available cell volume thereby allowing for an increase in the volume occupied by other cell components, e.g., an increase in anode or cathode material to increase cell capacity, or otherwise reducing the overall cell size. Furthermore, the anode subassembly 1 provided by the present invention may enable the use of thicker cathode material, which can crack more severely than relatively thinner cathodes, to increase the cell capacity with improved reliability.

Figure 4:
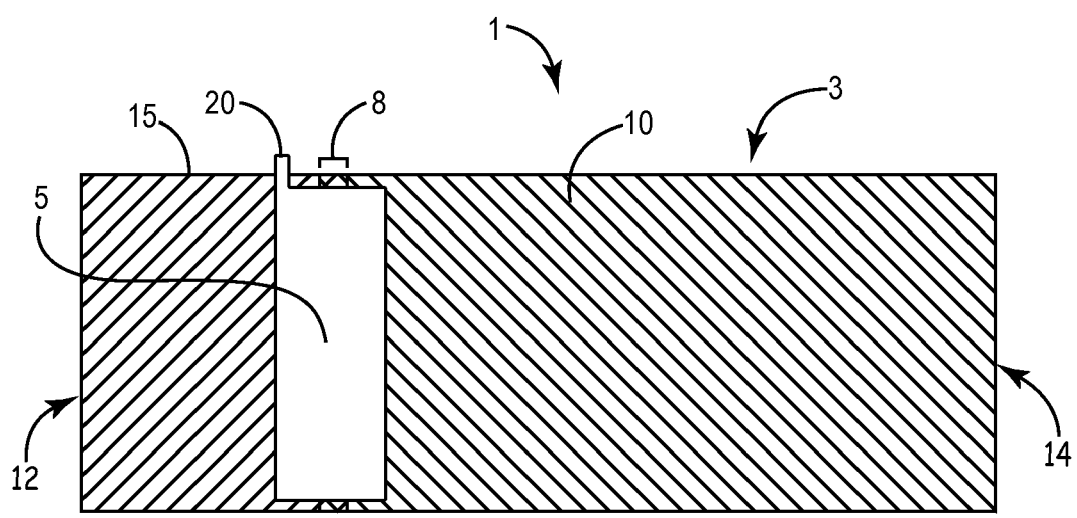
FIG. 4 is a top plan view of an alternative embodiment of an anode subassembly including an anode current collector of a reduced sized.

FIG. 4 is a top plan view of an alternative embodiment of an anode subassembly including an anode current collector of a reduced sized. In FIG. 4, reduced-size anode current collector grid 5 is positioned over the area of overlap 8 rather than along the trailing edge 12 of alkali metal anode 3. Anode current collector grid 5 thereby reinforces the area of overlap 8 between anode alkali metal pieces 10 and 15 yet does not extend into the second turn 128 of the outermost winding 125 where a short between the cathode 50 and anode current collector 5 would otherwise most likely occur.

As noted above, when the anode current collector 5 is reduced in size such that it does not reinforce the thin alkali metal piece 15 along its entire length on the outermost coil, the thin alkali metal piece 15 may be vulnerable to tearing or kinking during handling and electrode assembly procedures. It is desirable therefore to provide reinforcing elements to support the thin alkali metal piece 15 and/or the area of overlap 8 between the thin and thick alkali metal pieces 15 and 10, respectively, to thereby improve the handling properties of anode subassembly 1.

A spacer 30 may optionally provide support to the remaining area of the thin alkali metal piece 15, or a portion thereof, as described previously. With regard to the anode subassembly 1 of FIG. 4, for example, a spacer could be positioned to reinforce the thin alkali metal piece 15 along the second turn 128 and second straight segment 129 of the outermost coil winding 125.

Figure 5A:
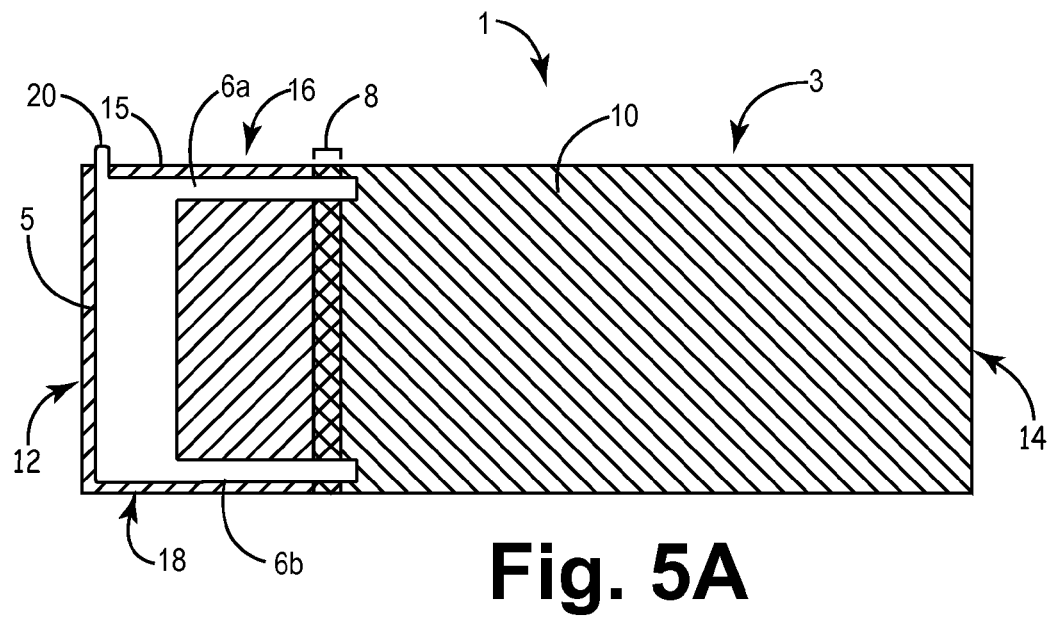
FIG. 5A is a top plan view of an anode subassembly having a reduced-size anode current collector with one or more anode-reinforcing extensions.

In the top plan view of an anode subassembly shown in FIG. 5A, a reduced-size anode current collector grid 5 is positioned along the trailing edge 12 of anode 3 and is provided with one or more anode-reinforcing extensions 6a and 6b. Anode current collector 5 with one or more extensions 6a and 6b may be fabricated from a single piece of an appropriate metal, such as nickel or titanium. Extensions 6a and 6b may be formed with perforations or as solid pieces.

In the embodiment shown in FIG. 5A, extensions 6a and 6b extend along the top edge 16 and bottom edge 18, respectively, of thin alkali metal piece 15 and over the area of overlap 8 between thin and thick alkali metal pieces 15 and 10. Extensions 6a and 6b reinforce the thin alkali metal piece 15 along its top and bottom edges 16 and 18 to improve the handling properties of the anode subassembly 1. Extensions 6a and 6a further reinforce the area of overlap 8.

Figure 5B:
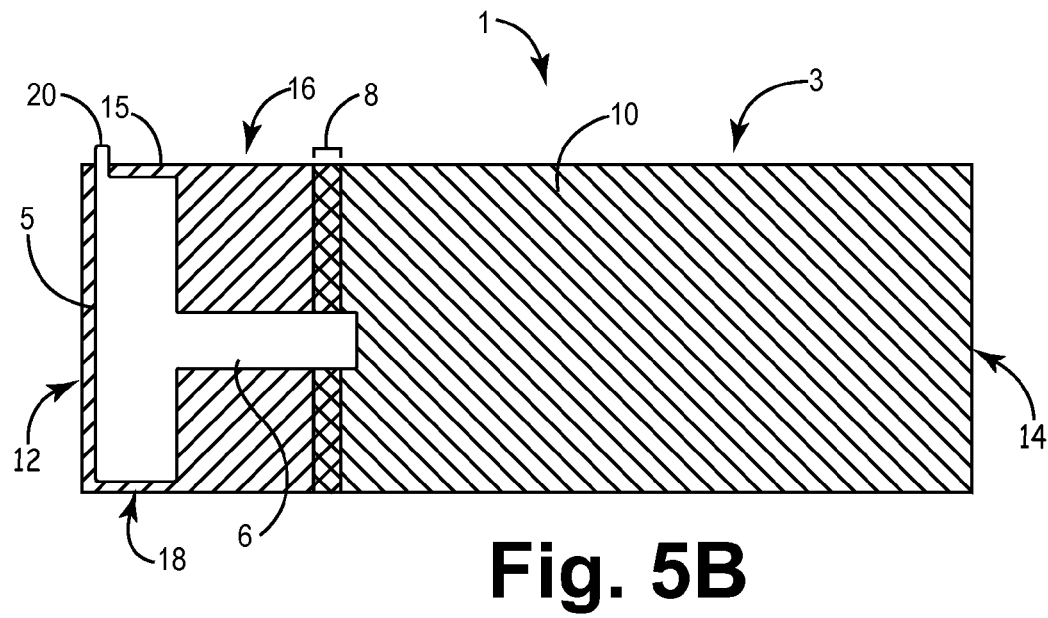
FIG. 5B is a top plan view of a variation of a reduced-size anode current collector having an anode reinforcing extension.

FIG. 5B is a top plan view of a variation of a reduced-size anode current collector grid having an anode reinforcing extension. In this embodiment, a single extension 6 extends over the area of overlap 8 approximately midway between the top and bottom edges 16 and 18 of the thin alkali metal piece 15. It is recognized that a number of variations of reduced-size anode current collectors having one or more reinforcing extensions are conceivable wherein the one or more extensions provide reinforcing support to at least a portion of alkali metal anode 3. It is further recognized, that an anode current collector grid 5 having one or more extensions 6 may be used in an anode subassembly that further includes a reinforcing spacer 30 used for reinforcing at least a portion of alkali metal anode 3, as described previously.

Figure 6A:
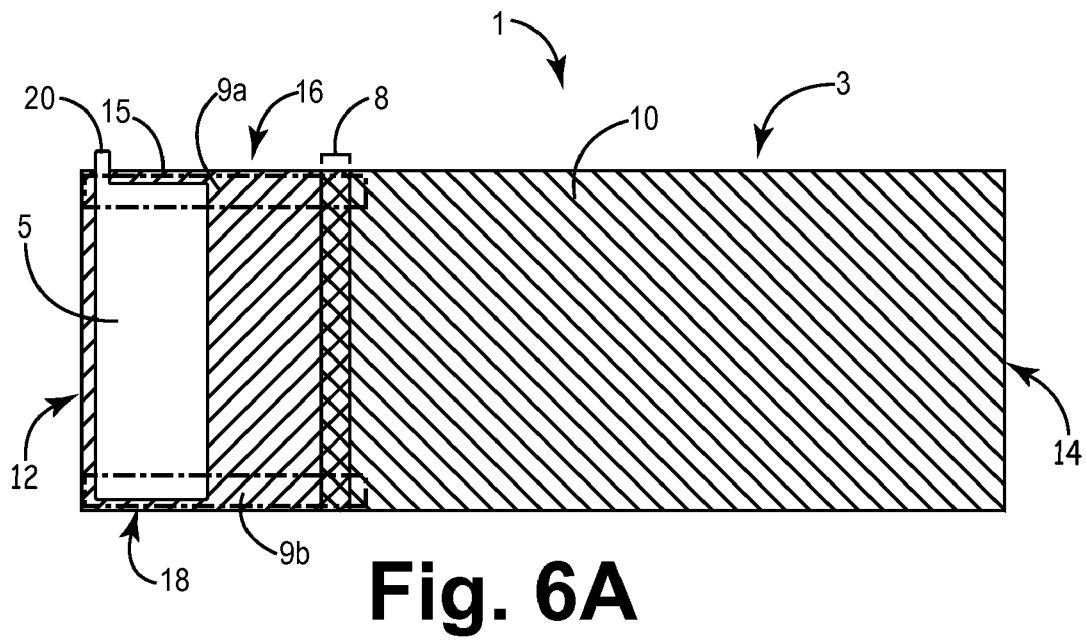
FIGS. 6A and 6B are top plan views of anode subassemblies having reduced-size anode current collector grids and anode reinforcing elements formed from alkali metal material.
Figure 6B:
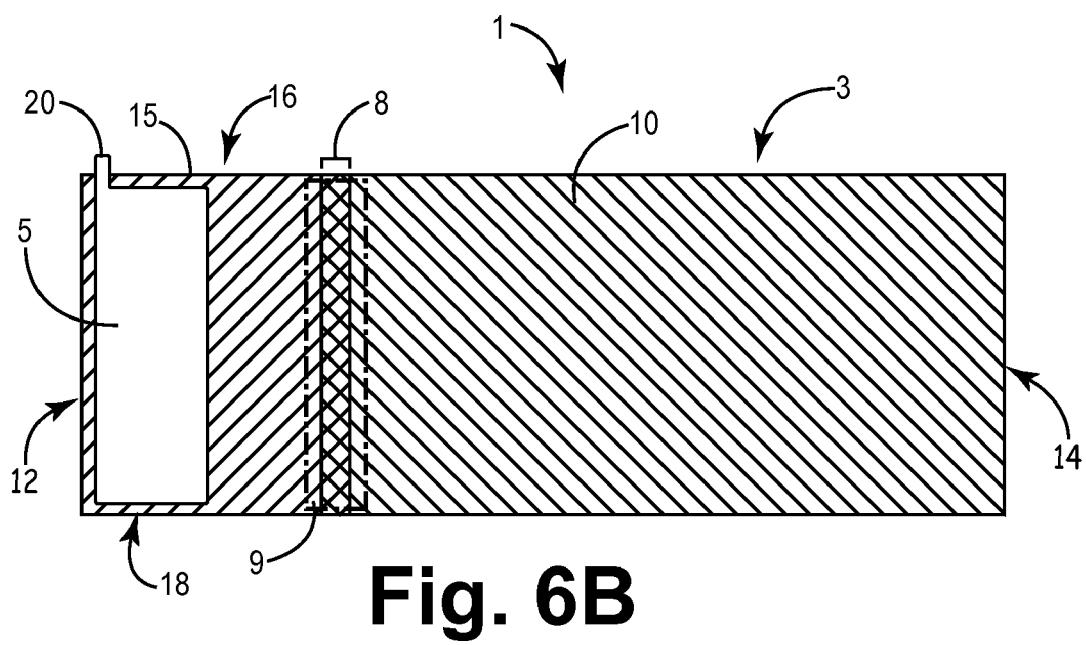

FIGS. 6A and 6B are top plan views of anode subassemblies having reduced-size anode current collector grids and anode reinforcing elements formed from alkali metal material. In FIG. 6A, two strips of alkali metal material are pressed onto alkali metal anode 3 on the side opposite of anode current collector grid 5 to form reinforcing elements 9a and 9b extending perpendicular to trailing edge 12, alongside top and bottom edges 16 and 18, respectively, of thin alkali metal piece 15. The reinforcing elements 9a and 9b improve the handling properties of anode subassembly 1 by reinforcing the top and bottom edges 16 and 18 of the thin alkali metal piece 15 and the area of overlap 8 between the thin and thick alkali metal pieces 15 and 10.

In FIG. 6B, a reinforcing element 9 formed from alkali metal is pressed onto anode 3 on the opposite side of anode current collector grid 5 over the area of overlap 8 between thin and thick alkali metal pieces 15 and 10. It is recognized that a variety of arrangements are conceivable for including reinforcing elements formed from alkali metal which may be pressed onto the alkali metal anode 3 in areas wherein reinforcement of the anode 3 is desired.

Figure 7A:
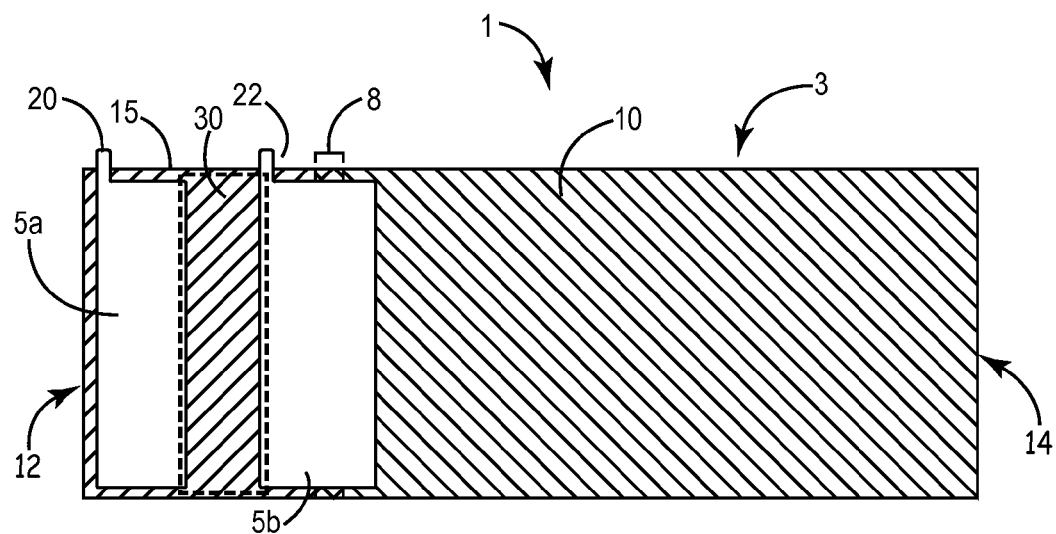
FIGS. 7A and 7B are top plan views of an anode subassembly having a discontinuous anode current collector.

FIG. 7A is a top plan view of an anode subassembly including a discontinuous anode current collector. The anode current collector is formed from a first section 5a and a second section 5b. At least one of anode current collector sections 5a and 5b is optionally provided with a projecting connector tab 20 or 22, respectively, to accommodate connection to a cell terminal. While both current collector sections 5a and 5b may be provided with connector tabs 20 and 22, respectively, one tab 20 or 22 is generally preferred over two tabs because a second tab may be difficult to connect to depending on the cell case configuration and/or be so close to a cathode tab that a short is difficult to avoid.

Anode current collector section 5a is pressed onto alkali metal anode 3 adjacent its trailing edge 12 and is sized such that anode current collector 5a will be present on the second generally straight segment 129 of the outermost winding 125 of a coiled electrode assembly 120. The second anode current collector section 5b is placed over the area of overlap 8 to provide reinforcement of the area of overlap 8 between the thin and thick alkali metal pieces 15 and 10 used to form anode 3. The second anode current collector section 5b may extend along the first turn 126 of the outermost winding 125 and further along a portion of, or all of, first generally straight segment 127 of the outermost winding 125. Preferably, neither first anode current collector section 5a nor second section 5b extend into the second turn 128 of the outermost winding 125.

In one embodiment, anode current collector section 5a, located on the second generally straight segment 129 of outermost winding 125, is provided with connector tab 20. When wound into a coiled electrode and assembled into a cell case, as will be described in detail below, tab 20 is positioned safely away from the cathode connector tab and is readily connected to a cell terminal. Anode current collector section 5b, located on the first turn 126 and first generally straight segment 127 of outermost winding 125, is provided as an anode reinforcing structure and lacks a connector tab.

One or both of anode current collector sections 5a and 5b may be provided as a solid current collector rather than a grid or perforated current collector. The use of a solid anode current collector is generally disclosed in commonly-assigned, co-pending U.S. patent application Ser. No. 10/661,920 filed on even date herewith and hereby incorporated by reference herein.

Figure 7B:
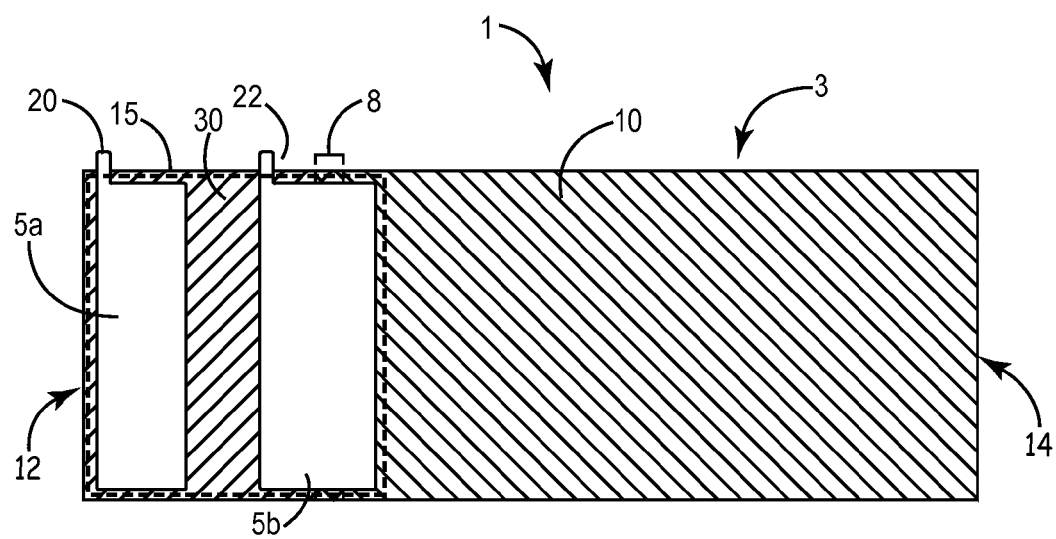

A spacer 30 may be pressed against the opposite side of the anode 3 to reinforce the area between the anode current collector sections 5a and 5b to thereby improve the handling properties of anode subassembly 1. Spacer 30 preferably encompasses the area between anode current collector sections 5a and 5b, as shown in FIG. 7A, but may optionally extend along the entire length of thin alkali metal piece 15 and/or over the area of overlap 8 between thin and thick alkali metal pieces 15 and 10, as shown in the top plan view of FIG. 7B. Spacer 30 may be fabricated from microporous film known for use as a separator in electrochemical cells, such as a polypropylene of polyethylene film, or from a porous or perforated fluoropolymer, such as perforated ETFE.

Figure 8:
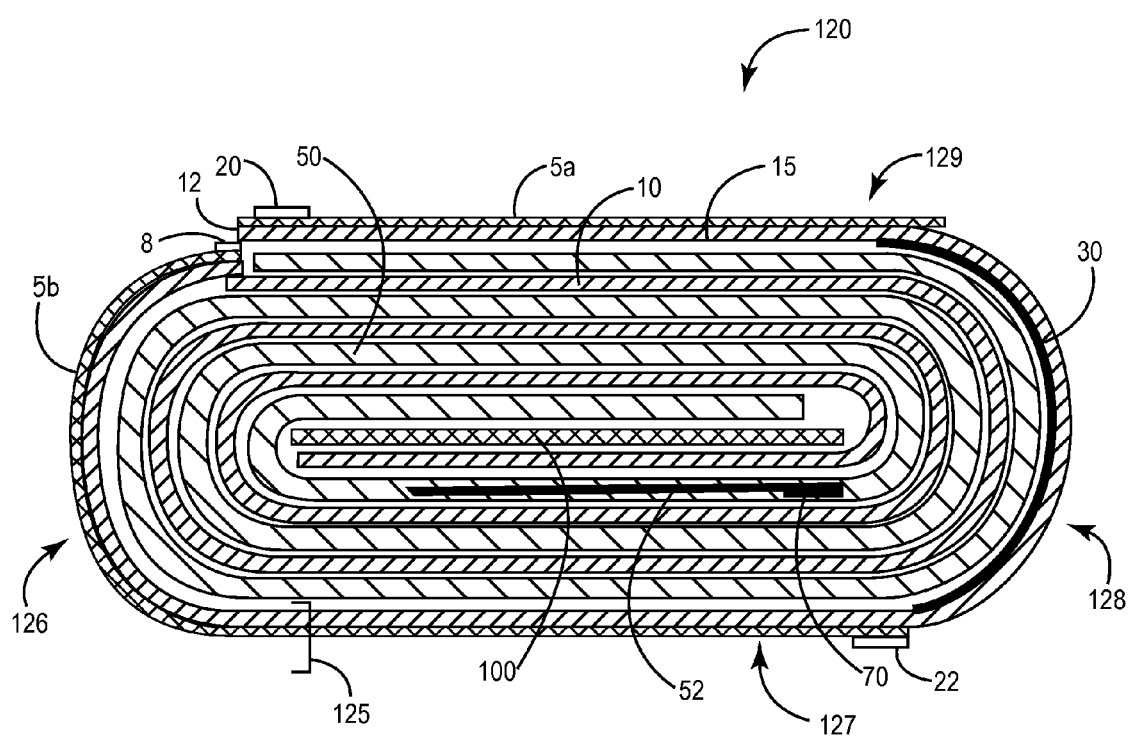
FIG. 8 is an end view of an electrode assembly including the anode subassembly shown in FIG. 7A.

FIG. 8 is an end view of an electrode assembly including the anode subassembly 1 shown in FIG. 7A. Anode current collector section 5b extends over the area of overlap 8 between thin and thick alkali metal pieces 15 and 10, through first turn 126 of outermost winding 125, and along first generally straight segment 127 of outermost winding 125. Spacer 30 extends along the inner face of second turn 128 of outermost winding 125. Anode current collector section 5a extends along second generally straight segment 129 of outermost winding 125. Thin alkali metal piece 15 is thereby reinforced along its entire length on outermost winding 125 by anode current collector sections 5a and 5b and spacer 30, yet the discontinuous anode current collector is not present in second turn 128 of outermost winding 125.

Figure 9:
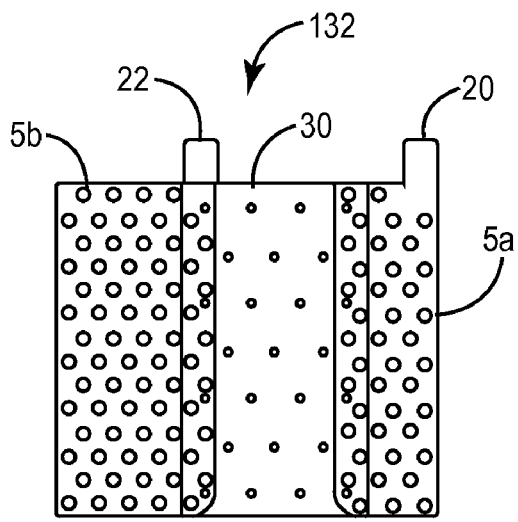
FIG. 9 is a top plan view of an anode current collector subassembly, which may be included in an anode subassembly.

FIG. 9 is a top plan view of an anode current collector subassembly, which may be included in an anode subassembly. Anode current collector subassembly 132 includes first anode current collector section 5a and second anode current collector section 5b and spacer 30. As shown in the exploded, perspective view of FIG. 10, spacer 30 is formed from two similarly-sized pieces 31 and 33 of microporous film, such as a polyolefin film, or a porous or perforated sheet of a fluoropolymer material, such as perforated ETFE.

Anode current collector 132 may be assembled by laying a first piece 31 of spacer 30 flat, positioning anode current collector sections 5a and 5b over spacer piece 31 such that the top and bottom edges are aligned as shown in FIG. 9. Anode current collector sections 5a and 5b preferably overlap spacer piece 31 but are spaced apart from each other a distance corresponding to the linear distance of the second turn 128 of the outermost coil winding 125 of a coiled electrode assembly 120. Second spacer piece 33 is laid over and aligned with first spacer piece 31 such that a portion of each of anode current collector sections 5a and 5b is "sandwiched" between spacer pieces 31 and 33. Spacer pieces 31 and 33 are then sealed together (e.g., by applying high pressure or heat and the like). The type of seal, and thus the amount of pressure or heat applied, will depend on the type of materials used.

The perforations of anode current collector sections 5a and 5b will allow spacer pieces 31 and 33 to be sealed together through the perforation openings in the areas wherein anode current collector sections 5a and 5b are "sandwiched" between spacer pieces 31 and 33. In this way, anode current collector sections 5a and 5b and spacer 30 are mechanically joined to form anode current collector subassembly 132, which may then be pressed into an alkali metal anode 3 using standard pressing methods described previously.

Figure 11:
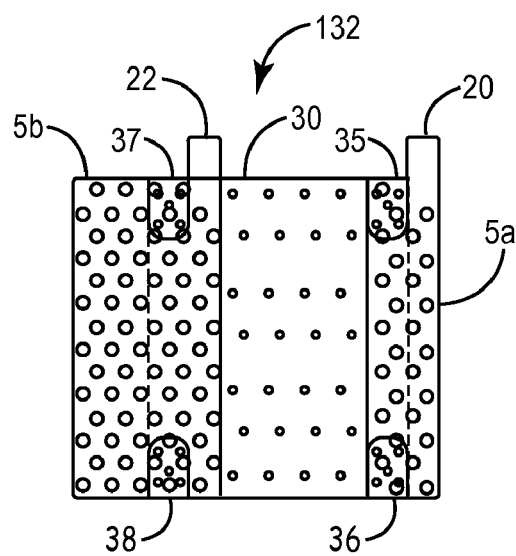
FIG. 11 is a top plan view of an alternative embodiment of an anode current collector subassembly.

FIG. 11 is a top plan view of an alternative embodiment of an anode current collector subassembly. In this embodiment, spacer 30 is formed from a single piece of porous or perforated film with multiple projecting tabs 35, 36, 37 and 38. Projecting tabs 35, 36, 37 and 38 are folded over anode current collector sections 5a and 5b as indicated by the arrows shown in the perspective view of FIG. 12. Once folded over the anode current collector sections 5a and 5b, projecting tabs 35, 36, 37 and 38 are sealed to the main body of spacer 30 by applying high pressure or heat to seal projecting tabs 35, 36, 37, and 38 onto spacer 30 through the openings formed by the perforations of anode current collector sections 5a and 5b.

Figure 10:
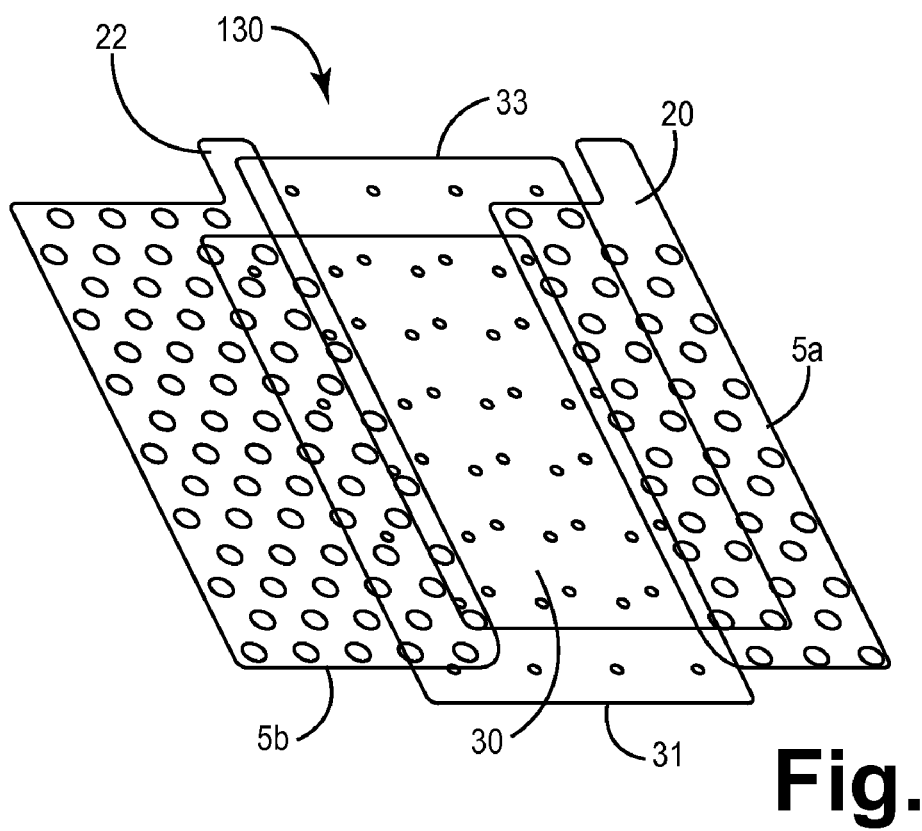
FIG. 10 is a perspective view of a method for assembling the anode current collector subassembly of FIG. 9.
Figure 12:
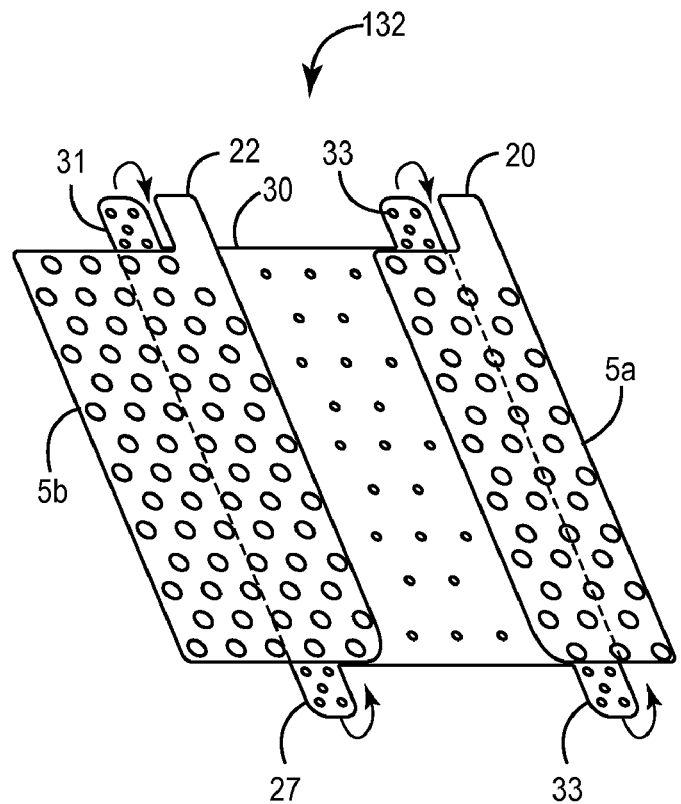
FIG. 12 is a perspective view illustrating a method for assembling the anode current collector subassembly of FIG. 11.

Spacer 30 formed of a single layer as shown in FIGS. 11 and 12 does not occupy as much cell volume as a double-layered spacer 30 shown in FIGS. 9 and 10. Furthermore, more of the surface area of current collector sections 5a and 5b remains exposed in the embodiment shown in FIGS. 11 and 12 with the tradeoff that the mechanical joining of sections 5a and 5b with spacer 30 may be less robust than in the two-layer design of FIGS. 9 and 10. It is recognized that a variety of configurations may be conceived for arranging and mechanically joining a discontinuous anode current collector and spacer material to form an anode current collector subassembly.

In the embodiments shown in FIGS. 9 through 12, a double layer of spacer 30 in the sealed areas overlapping the anode current collector sections 5a and 5b adds thickness to the anode subassembly. In order to prevent the anode current collector sections 5a and 5b from being pressed against the cathode 50 in an electrode assembly, the sealed areas of spacer 30 are preferably kept flush with the surface of the anode current collector sections 5a and 5b.

FIG. 13 is a perspective view of an anode subassembly enveloped in a separator provided with a spacer positioned on the outside of the separator 110. As described previously, anode subassembly 1 may be enveloped within a separator 110, which is sealed closed, prior to assembling electrode assembly 120. As generally disclosed in previously referenced, co-pending U.S. patent application Ser. No. 10/661,666, a spacer may be sealed to an outer or inner face of the separator 110 to form a separator subassembly.

In FIG. 13, an alternative embodiment of a separator subassembly is illustrated. Spacer 45 in this embodiment is formed by a folded sheet of porous film appropriate for use as a battery separator material. As shown in the perspective view of FIG. 14, the folded spacer 45 is provided with one or more slits 47 and 49 to accommodate one or more anode connector tabs 20 and 22. After anode subassembly 1 is sealed within separator 110 with anode connector tabs 20 and 22 extending through separator slits 123 and 124, spacer 45 may be placed over separator 110 as indicated by arrow 48. Spacer slits 47 and 49 are aligned with anode connector tabs 20 and 22 such that spacer 45 hangs over separator 110 and is held in place by anode connector tabs 20 and 22 extending through spacer slits 47 and 49 and thereby remains in place during electrode winding.

In an alternative embodiment, spacer 45 is positioned directly over anode subassembly 1, prior to enveloping anode subassembly 1 within separator 110, by aligning one or more spacer slits 47 and 49 with one or more anode connector tabs 20 and 22 such that spacer 45 hangs over anode subassembly 1. Anode subassembly 1, with overhanging spacer 45, is then enveloped within separator 110, which may optionally be sealed closed on any or all of its open sides. Hence, spacer 45 may be located either inside or outside of separator 110.

Figure 15A:
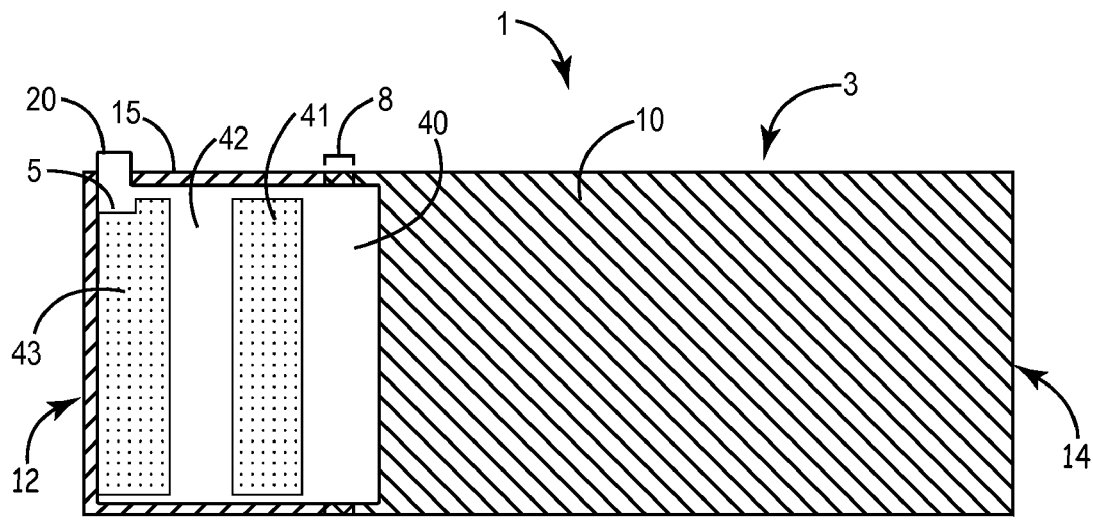
FIGS. 15A and 15B are top plan views of alternative embodiments of an anode subassembly wherein the anode current collector is provided with perforated or grid areas alternating with solid areas.
Figure 15B:
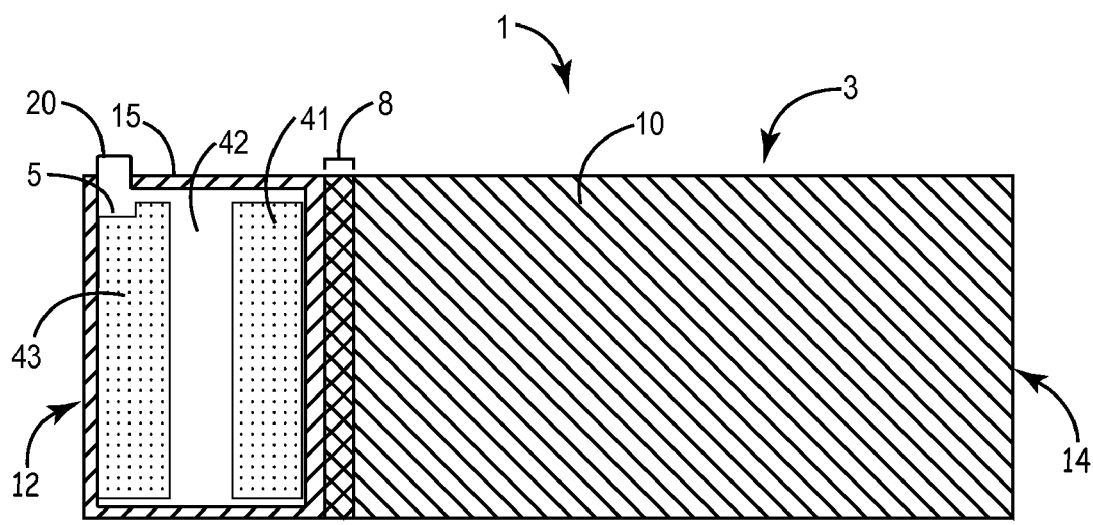

In the top plan views of FIGS. 15A and 15B, alternative embodiments of anode subassembly 1 are shown wherein the anode current collector 5 has perforated or grid areas alternating with solid areas. In FIG. 15A, a first solid area 43 is provided to support the area of overlap 8 between thick and thin alkali metal pieces 10 and 15. The first solid area 40 may extend along the first turn 126 of the outermost winding 125. A first perforated area 41 will be positioned along the first straight segment 127 of the outermost winding 125. A second solid area 42 will be positioned along the second turn 128 of the outermost winding 125, and a second perforated area 43 will be positioned along the second straight segment 129 of the outermost coil winding 125.

Solid anode current collector areas 40 and 42 provide support to the area of overlap 8 of thick and thin alkali metal pieces 10 and 15 and eliminate anode current collector edges normally present in perforated or grid type current collectors from the turns of the outermost coil winding 125, in particular the second turn 128 of the outermost coil winding 125, where a short between the cathode 50 and anode current collector 5 is otherwise most likely to occur. The cathode 50 is less likely to push through a separator in areas 40 and 42 where the anode current collector 5 is solid, i.e., without openings that create edges that the cathode 50 can press into and against. Separator material is less likely to tear when pressed against a solid area 40 or 42 of anode current collector 5. Thus, in the region where a short is most likely to occur, namely second turn 128 of the outermost coil winding 125, solid area 42 of anode current collector 5 is expected to reduce the likelihood of a short from occurring.

Since the potential shorting mechanism between a cathode and anode current collector grid is thought to most likely occur only in the second turn of the outermost winding of a coiled electrode, the solid area 40 of the anode current collector 5 is optional for the purposes of reducing the risk of a short. In FIG. 15B, anode current collector 5 includes alternating perforated areas 41 and 43 with intervening solid area 42. Perforated areas 41 and 43 will be positioned along the first and second straight segments 127 and 129, respectively, of outermost coil winding 125 and solid area 42 will be positioned along second turn 128 of outermost coil winding 125. A spacer or a reinforcement element may be provided over the area of overlap 8, as described previously, if added support of the area of overlap 8 between thick and thin alkali metal pieces 10 and 15 is desired.

Figure 16:
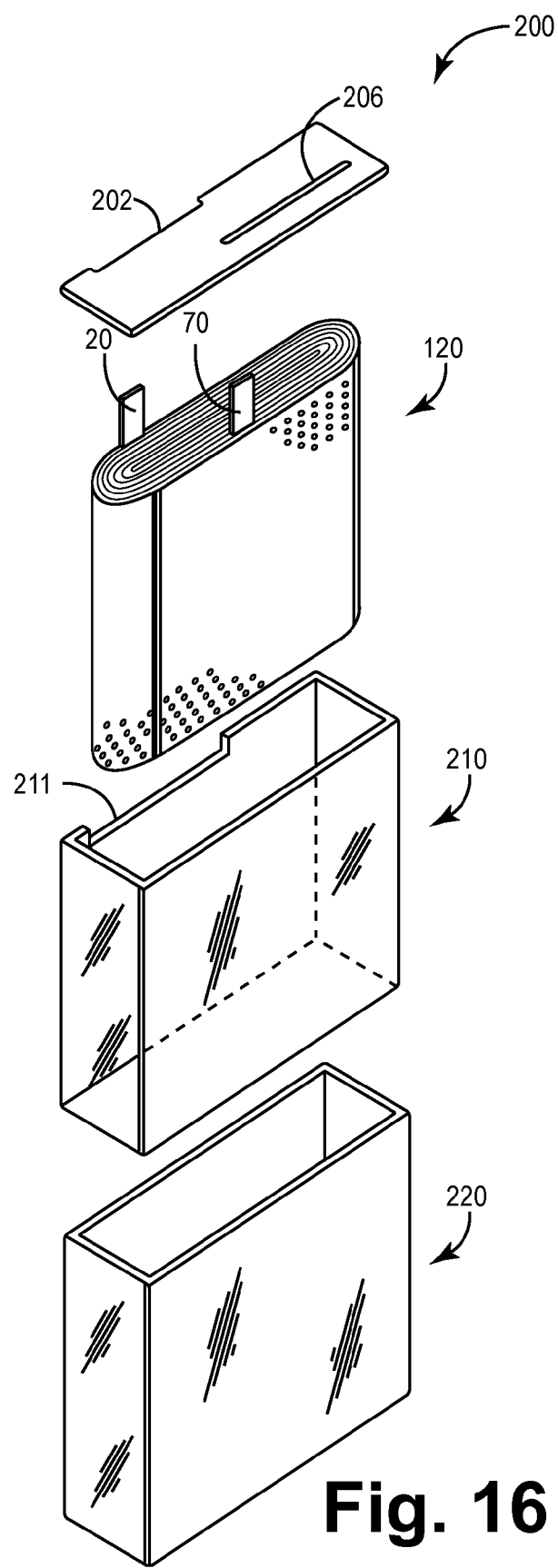
FIG. 16 is an exploded perspective view showing the insertion of the electrode assembly shown in FIG. 3 in a battery case together with insulator materials.
Figures 17, 18:
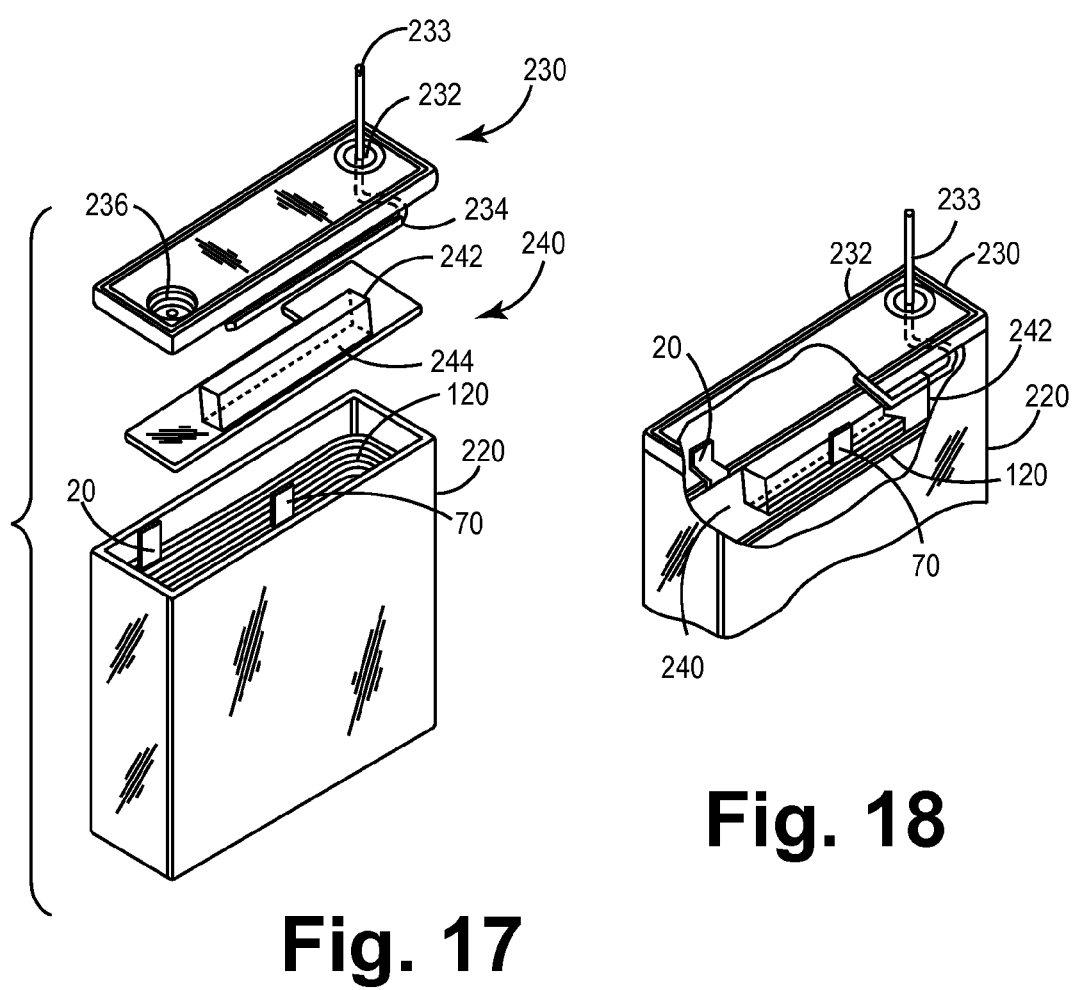
FIG. 17 is an exploded perspective view showing the application of the insulator and case top to the case and electrode assembly shown in FIG. 16.
FIG. 18 is a partially cut-away perspective view of the completed battery showing the connection of the electrode assembly connector tabs with the case elements.

Assembly of the electrode assembly 120 into an exemplary battery is shown in FIGS. 16 through 18. In FIG. 16, a coil insulator 200 is placed onto the electrode assembly 120. The coil insulator includes a notch 202 to accommodate anode connector tab 20 and slit 206 to accommodate cathode connector tab 70. The electrode assembly 120 is also inserted into an insulating case liner 210. The case liner 210 preferably extends at its top edge above the edge of the electrode assembly 120 in order to provide an overlap with other insulating elements. If so, it may include a notch 211 on one side in order to allow the connection of the anode connector tab 20 to the case 220, for a case negative battery. The coil insulator 200 and case liner 210 are preferably made from a polyolefin polymer or a fluoropolymer such as PTFE or PCTFE. The electrode assembly 120 and case liner 210 are then inserted into a battery case 220, preferably made of stainless steel or titanium. The battery case 220 is shown as a prismatic, deep-drawn case in FIG. 16, however, the electrode assembly 120 may be placed in battery cases that are non-prismatic, e.g., having arcuate geometries, and/or shallow rather than deep as generally disclosed in commonly-assigned, co-pending U.S. patent application Ser. No. 10/260,629 filed 30 Sep. 2002, entitled, "Contoured Battery for Implantable Medical Devices and Method of Manufacture," and invented by Aamodt et al.

In FIG. 17 a case cover 230 and a pin insulator 240 are shown along with the electrode assembly 120 and case 220. The case cover 230 has a glassed-in feedthrough 232 and feedthrough pin 233 extending through an aperture in the case cover 230 that has a bend 234 which is intended to place the feedthrough 232 in alignment with the cathode connector tab 70. The case cover 230 also has a fill port 236. Later in the battery assembly process, an appropriate electrolyte solution is introduced through the fill port 236, and the fill port 236 is sealed. The electrolyte solution can be an alkali metal salt in an organic solvent such as a lithium salt (i.e., 1.0M $LiClO_4$ or $LiAsF_6$) in a 50/50 mixture of propylene carbonate and dimethoxyethane. The sealing process may include, for example, making a first seal by pressing a plug into the aperture of the fill port 236 and making a second seal by welding a cap or disc over the fill port 236. Material utilized for leak checking hermetic seals may be included between the first and second seals.

The case cover 230 is made from stainless steel, and the feedthrough pin 233 is preferably niobium or molybdenum. The pin insulator 240 has an aperture 242 leading into a raised portion 244 which receives the feedthrough pin 233 and insulates the feedthrough pin 233 from contact with the case cover 230. In combination with one side of the coil insulator 200, which is immediately below the pin insulator 240, the raised portion forms a chamber, which isolates the cathode connection. Additional insulation in the form of tubing or a coating may also be included on the feedthrough pin 233 and feedthrough 232 at locations that will not be welded to further insulate the feedthrough pin 233 and feedthrough 232. An optional cover insulator could be applied to the underside of the case cover 230 to provide additional insulation for the case cover 230.

The feedthrough pin 233 is welded to the cathode connector tab 70 as shown in FIG. 18. The anode connector tab 20 is welded to the side of the case 220 thereby making the metal case 220 one terminal or contact for the battery (i.e. a case negative design). The feedthrough pin 233 is then inserted through a split in the pin insulator 240 until it projects through the aperture 242 of the pin insulator 240. The electrode assembly 120 may be out of the case 220 during some of the welding and bending operations. The case cover 230 is then welded to the case 220 to seal the electrode assembly 120 in the case. The cathode connection is thoroughly isolated from the portions of the battery at anode potential, and the feedthrough connection is thoroughly isolated from stray particles of material from the cathode and from anode particles that may form during discharge of the battery.

Thus, an electrochemical cell has been disclosed having an anode subassembly designed to reduce the risk of a short occurring between the cathode and the anode. Furthermore, the cell volume occupied by the anode current collector may advantageously be reduced, and the anode subassembly is reinforced for improved handling properties. While the embodiments described herein have been directed toward a lithium-limited cell having a coiled electrode configuration, it is recognized that aspects of the present invention may be beneficially implemented in other types of cells, either anode-or cathode-limited cells, having a variety electrode configurations. The disclosed embodiments are therefore intended to be exemplary, rather than limiting, with regard to the following claims.

What is claimed is:

1. A coiled electrode for an electrochemical cell, comprising
  an elongated electrode assembly having a coiled but generally flat configuration, said assembly having a final winding comprised of a penultimate turn, a penultimate generally straight segment, a final turn, and a final generally straight segment, and wherein a lateral thickness dimension of the assembly of the final winding is less than the remaining windings; and
  a substantially planar current collector appropriately configured to be disposed adjacent an exterior surface of either:
    (configuration a) a majority of the final generally straight segment, or
    (configuration b) a majority of the penultimate turn, a majority of the penultimate generally straight segment, and a majority of the final generally straight segment;
  wherein the current collector further comprises a solid planar member that is further disposed adjacent an exterior surface of said final turn.

2. A coiled electrode according to claim 1, wherein the elongated electrode assembly further comprises: a first relatively thick member and a second relatively thin member coupled together to form an overlapping region.

3. A coiled electrode according to claim 2, further comprising, a spacer member disposed:
  on at least the inner face of the final turn of the electrode assembly (configuration a) or,
  on at least the inner face of: the penultimate turn, the penultimate generally straight segment and the final turn of the electrode assembly (configuration b).

4. A coiled electrode according to claim 3, wherein said spacer member at least partially overlaps a portion of the current collector disposed adjacent the final generally straight segment.

5. A coiled electrode assembly according to claim 4, wherein said spacer member at least partially overlaps at least a portion of the overlapping region.

6. A coiled electrode according to claim 3, wherein said spacer member comprises at least two sheets of material, a first and a second of said at least two sheets coupled to opposing major surfaces along at least a part of a peripheral edge of the current collector.

7. A coiled electrode according to claim 2, wherein said electrode assembly further comprises a sheet-type dielectric separator disposed over at least the exposed surface of the current collector.

8. A coiled electrode according to claim 7, wherein said dielectric separator substantially surrounds the electrode assembly.

9. A coiled electrode according to claim 8, wherein said dielectric separator further comprises: at least two layers of separator material, and both of said at least two layers disposed on opposing major faces of the electrode assembly.

10. A coiled electrode according to claim 7, further comprising an additional portion of separator material disposed adjacent a planar portion of the proximal, interior end of the elongated electrode assembly.

11. A coiled electrode according to claim 2, wherein a portion of said current collector covers at least a portion of the overlapping region.

12. A coiled electrode according to claim 11, wherein said portion of said current collector comprises at least one minor axially extending arm of said current collector and a major portion of said current collector is disposed on the final generally straight segment.

13. A Coiled electrode according to claim 2, wherein at least one reinforcing element is disposed adjacent a portion of said current collector, a portion of the overlapping region, or both a portion of said current collector and said overlapping region.

14. A coiled electrode according to claim 2, wherein the solid planar member that is further disposed adjacent an exterior surface of said final turn, wherein the solid planar member being devoid of apertures adjacent said final turn and perforated adjacent the final generally straight segment.

15. A coiled electrode according to claim 14, wherein at least a portion of the current collector is disposed adjacent at least a portion of the overlapping region.

16. A coiled electrode according to claim 2, wherein said elongated electrode assembly comprises a lithium material.

17. A coiled electrode according to claim 16, wherein said current collector comprises: a nickel material, a copper material, a titanium material.

18. A coiled electrode for an electrochemical cell, comprising:
- an elongated electrode assembly having a coiled but generally flat configuration, said assembly having a final winding comprised of a penultimate turn, a penultimate generally straight segment, a final turn, and a final generally straight segment, and wherein a lateral thickness dimension of the assembly of the final winding is less than the remaining windings; and
- a substantially planar current collector appropriately configured to be disposed adjacent an exterior surface of either:
    - (configuration a) only a majority of the final generally straight segment, or
    - (configuration b) only a majority of the penultimate turn, a majority of the penultimate generally straight segment, and a majority of the final generally straight segment;
- wherein said current collector comprises a solid planar member that is further configured to be disposed adjacent an exterior surface of said final turn, wherein the solid planar member being devoid of apertures adjacent said final turn and being perforated adjacent the final generally straight segment.

* * * * *

UNITED STATES PATENT AND TRADEMARK OFFICE
CERTIFICATE OF CORRECTION

PATENT NO. : 7,297,443 B2  Page 1 of 1
APPLICATION NO. : 10/661909
DATED : November 20, 2007
INVENTOR(S) : Paul B. Aamodt et al.

It is certified that error appears in the above-identified patent and that said Letters Patent is hereby corrected as shown below:

In the Claims:

Col. 16 line 50 claim 3, delete "straight segment and" and insert in place thereof -- straight segment, and --;

Signed and Sealed this

Nineteenth Day of October, 2010

David J. Kappos
*Director of the United States Patent and Trademark Office*